United States Patent Office 2,744,028
Patented May 1, 1956

2,744,028

METHOD FOR PREPARATION OF COMPOSITE PIGMENTS

William Grave, Livingston, N. J., assignor to National Lead Company, New York, N. Y., a corporation of New Jersey No Drawing. Application April 23, 1952,
Serial No. 283,992

8 Claims. (Cl. 106—300)

This invention relates to production of composite pigments. More specifically it relates to the production of coalesced titanium dioxide alkaline earth metal sulphate composite pigments, particularly those in which the titanium dioxide is in the rutile form.

Many methods have been presented for the preparation of titanium dioxide composite pigments. Broadly the term "composite pigments" includes those pigmentary compositions comprising two or more constituents. Typical examples of such composite pigments are those products of the instant invention in which titanium dioxide is intimately associated with calcium sulphate or barium sulphate and the like. Prior art procedures for making titanium dioxide composite pigments include those in which the titanium dioxide is present in either the anatase or rutile form. The instant invention is particularly concerned with the production of composite pigments in which the rutile form of titanium dioxide is obtained.

In the prior art methods for making composite pigments containing titanium dioxide in rutile form it is customary to obtain the titanium dioxide by the hydrolysis of titanium sulphate solution. The extender, such as, for example, calcium sulphate anhydrite, may be present during the hydrolysis of the titanium sulphate solution, and the mixture resulting from the hydrolysis step may be calcined to convert the titanium dioxide portion to rutile form. Alternatively the rutile titanium dioxide may be obtained separately by hydrolysis of suitable titanium sulphate solutions combined with a subsequent calcination step, and it then may be admixed with the extender. In either case a rutile converting seed or rutile promoter which has been separately prepared must be added as some distinct step prior to calcination of the titanium dioxide values in order to obtain the rutile form upon such calcination.

An object of this invention is to prepare high quality rutile titanium dioxide composite pigment. Another object is to provide a process wherein rutile titanium dioxide composite pigment may be prepared without the necessity of separately preparing rutile converting seeds or promoters. A still further object is to provide a simple and economical process for producing such rutile titanium dioxide composite pigments wherein the titanium values are obtained from titanium sulphate solutions. These and other objects will become apparent from the following more complete description of the instant invention.

In its broadest aspects this invention contemplates a method for the preparation of rutile composite pigment wherein the titanium values are obtained from a titanium sulphate solution. According to the instant process there is provided an alkaline earth metal sulphate slurry and a titanium sulphate solution containing a quantity of titanium values calculated to produce a composite pigment of predetermined composition. One portion amounting to between 5% and 50% of said titanium sulphate solution is boiled in the presence of said slurry, thereby forming a mixture of precipitated titanium values and said alkaline earth metal sulphate. The remaining portion of the titanium sulphate solution is then combined with the mixture and the combination is further boiled to completely precipitate the remaining titanium values. The combined precipitated titanium values and alkaline earth metal sulphate are then filtered, washed, and subsequently calcined at temperatures from 900° C. to 1000° C., thereby forming rutile titanium dioxide in said composite pigment.

In carrying out the process of the instant invention a titanium sulphate solution is first prepared by reacting titaniferous iron ore, such as ilmenite ore or a slag prepared from a titaniferous iron ore, with concentrated sulphuric acid. Such a solution may be prepared by digestion methods well-known in the art.

In addition to the titanium sulphate solution, it is necessary to prepare a heavy slurry of the extender. This slurry may be prepared by reacting an oxidic compound of the alkaline earth metal with sulphuric acid, preferably concentrated, to form an insoluble sulphate. The consistency of the mixture may be controlled by adjusting the amount of water or the strength of acid employed. A particularly useful type of extender is that comprising calcium sulphate anhydrite. The preparation of such slurries is also well-known in the art.

In order to obtain satisfactory production capacities, it is preferred to use a slurry of the extender containing about 30%–35% solids, and the acid liquor in the slurry should contain not substantially less than about 50 grams per liter sulphuric acid. Such slurries, although heavy and not easily stirred, however, can be handled quite readily in large scale operations. Thinner slurries containing lower percentages of solids can also be used, but obviously the throughput of material will be decreased. Employing thick slurries having concentrations which are above 35% solids creates difficulties in obtaining thorough mixing. Employment of somewhat thinner slurries, say those containing from 10 to 30% solids, may be desirable when smaller portions of the total titanium sulphate solution, such as from about 5% to 25% of the total, are initially combined with the alkaline earth metal sulphate slurry. When such thinner slurries are used, the total acid concentration is somewhat reduced in the extender slurry-titanium sulphate mixture prior to the initial hydrolysis and precipitation of the titanium values, and it has been observed that such reduction of the total acid concentration often aids in the development of good quality rutile products.

In carrying out the process of the instant invention, the titanium sulphate solution is divided into two portions. One of the portions is thoroughly combined with the slurry of the extender, and the mixture is boiled to hydrolyze the titanium values which are present. After hydrolysis of the titanium values occurs, the remaining portion of the titanium sulphate solution is then added to the mixture, preferably at boiling temperature, to complete the hydrolysis of the remaining titanium values. The final hydrolysate is filtered, washed, bleached if necessary, and calcined.

It has been found that by employing the process of the instant invention satisfactory rutile composite pigment may be prepared without the addition of separately prepared nucleating or rutile promoting agents, when from 5%–50% of the total titanium sulphate solution is added to the slurry of the extender as the first portion. When the first portion amounts to between 25–50% of the total titanium sulphate solution, the resulting products are slightly superior to those produced when smaller amounts of solution are employed as the first portion. Furthermore, the employment of amounts between 25–50% of the total as the first portion allows heavier extender slurries to be used which provides for increased material throughput and results in more economical utilization of production facilities. As previously stated, when employing between 5% and 25% of the total titanium sulphate solution as the first portion, it is desirable to utilize extender slurries which contain somewhat lower percentages of solids. By reducing the solid content in this manner one is better able to handle the materials; however, such lowering of percentage solids in the extender slurry tends to result in decreased operational throughput and further adds to the overall cost in producing composite pigment.

As stated above, substantially any type of titanium sulphate solution may be employed in the process of this invention. However, it has been found that solutions prepared from slags made from titaniferous iron ores are particularly adaptable to this process, and the titanium values therein appear to be rapidly converted to rutile upon calcination.

The amount of sulphuric acid present in the titanium sulphate solution will depend upon the type of titaniferous material to be digested and upon the type of solution desired. Ordinarily the so-called basic solutions are preferred, i. e. solutions in which the weight ratio of active sulphuric acid to $TiO_2$ is less than 2.45 or less than that which corresponds to the formula $Ti(SO_4)_2$. Such solutions may be obtained by digesting a titanium-containing material with an amount of concentrated sulphuric acid sufficient to convert the reactable non-titaniferous constituents such as sodium, calcium, magnesium, aluminum, iron etc. to sulphates and also to convert the titanium values to sulphates of the calculated basicity. It is possible to operate with solutions up to about 50% basicity that is, solutions in which the weight ratio of $H_2SO_4$ to $TiO_2$ corresponds to the formula $TiOSO_4$. It is, however, preferred to employ solutions of about 20% basicity. The concentration of the solution may be regulated by the amount of sulphuric acid and water used in the digestion step, and it has been found that solutions containing about 13% $TiO_2$ are particularly advantageous to employ in the instant process. It is particularly advantageous to adjust the amount of extender slurry and titanium sulphate solution in order to obtain a final composite pigment containing about 30% titanium dioxide and 70% extender. Such composite pigments fall within the commercially acceptable types which are readily marketable. The action which occurs during the hydrolysis steps of the instant invention, that is, the hydrolysis of one portion in the presence of the extender slurry and the subsequent hydrolysis of the remainder of the titanium solution in the presence of the mixture is not known. However, by this process the titanium values in the titanium sulphate solution are hydrolyzed in such a manner that they are present in a form which readily converts to rutile upon calcination, and thus the employment of rutile seeds at hydrolysis or rutile converting agents prior to calcination is not necessary.

In order to obtain the most desirable properties in the final product it may be advisable to adjust the amount of sulphuric acid present in the mixture of anhydrite slurry and titanium sulphate solution before the mixture is boiled to precipitate the titanium values therefrom. It has been found that the most desirable results are obtained when there are from about 2.5 to about 5.0 parts (weight basis) of sulphuric acid for each part of titanium dioxide and preferably from 3.15 to 3.75 parts of acid for each part of titanium dioxide. When more than about 35% of the total titanium sulphate solution is employed as the first portion, it may be necessary to add additional sulphuric acid prior to boiling the mixture in order to obtain the desired sulphuric acid-titanium dioxide relationship.

In order to more fully illustrate the process of the instant invention, the following examples are presented:

*Example I*

A titanium sulphate solution was prepared from a titaniferous slag material by digestion in strong sulphuric acid using known digestion procedures. The solution had the following analysis:

| | |
|---|---|
| Specific gravity | 1.456 |
| $Ti^{3+}$ as $TiO_2$ g. p. l. | 4.0 |
| Total $TiO_2$ per cent | 13.05 |
| $H_2SO_4$ do | 26.47 |
| $FeSO_4$ do | 2.68 |
| $H_2SO_4/TiO_2$ | 2.05 |
| Basicity | 17.3 |

An anhydrite slurry containing 34.4% solids and 5.4% sulphuric acid also was prepared by reacting high grade lime with sulphuric acid. In order to prepare a rutile titanium dioxide composite pigment from this titanium solution, 400 parts of the 34.4% solids anhydrite slurry were placed in a precipitation vessel equipped with a stirrer and reflux condenser. Titanium sulphate solution equivalent to the amount required to produce a final pigment, containing 30% $TiO_2$ based on the amount of anhydrite slurry present, was divided into two portions. The minor portion, comprising ⅓ of the total titanium solution, was added to the slurry, the sulphuric acid adjusted to about 3.75 parts for each part of $TiO_2$ and the mixture was boiled for 30 minutes to precipitate the titanium values in the mixture. After precipitation the remaining two-thirds of the solution was then added to the mixture over a 2-hour period during which time the mixture was kept at boiling temperature. After the addition of the remaining portion was complete the entire mixture was boiled for an additional hour to complete the precipitation of the titanium values. The recovery of the titanium values was 96%. The mixture of precipitated titanium hydrate and the calcium sulphate was then deliquored on a filter, washed free of iron, bleached at 80° C. in 5% sulphuric acid containing a small amount of $Ti^{3+}$ and then calcined at 975° for 2 hours. The calcined product was chaser-milled and mikropulverized. The product was analyzed as 30.2% $TiO_2$ and the titanium values found to be 100% rutile. It possessed a Reynolds tinting strength of 600.

*Example II*

Using the procedure described in Example I, a solution was prepared by the digestion of an ilmenite ore and had the following analysis:

| | |
|---|---|
| Specific gravity | 1.4555 |
| $Ti^{3+}$ as $TiO_2$ g. p. l. | 1.6 |
| Total $TiO_2$ per cent | 11.5 |
| $H_2SO_4$ | 23.6 |
| $FeSO_4$ | 26.5 |
| $H_2SO_4/TiO_2$ | 2.05 |
| Basicity | 16.3 |

This solution was divided into two portions as described in Example I. One-third of the total solution was first added to the anhydrite solution, the acid content adjusted as in Example I to 3.75 parts for each part of $TiO_2$ and the mixture was boiled. The remaining two-thirds was then added and the boiling continued. The precipitate was then processed according to Example I. Substantially all of the titanium values were found to be in the rutile form, and the final product had a tinting strength of 585.

*Example III*

The procedure used in Example I was repeated except the anhydrite slurry was cut to 30% solids. The titanium sulphate solution having the analysis shown in Example I was divided into two portions, one portion comprising 10% of the total. This small portion was added to the anhydrite slurry and even though the per cent solids had been cut to 30% a thick mass was obtained. The mixture was boiled, and the remaining 90% of titanium sulphate solution was then added and the mixture subsequently further boiled. The product after calcining at 950° C. for 1 hour contained 95% rutile and had a tinting strength of 595.

For comparative purposes and in order to illustrate the advantages of the instant process, two additional runs were also conducted. In one instance the procedure as described in Example I was essentially duplicated with the exception that the first portion of the titanium sulphate solution comprised only 3% of the total amount. Upon calcination the titanium values did not readily convert to the rutile form, and thus an inferior product with respect to both rutile content and tinting strength was obtained.

In another instance the procedure as described in Example I was again essentially duplicated, however, this time about 65% of the total titanium sulphate solution was employed as the first portion which was admixed with the extender slurry. Subsequent processing as described in the first example yielded a product also having inferior properties of rutile content and tinting strength.

In view of the above description and by the examples presented, it has clearly been shown that rutile titanium dioxide composite pigment may be prepared by the process of the instant invention in a simple and direct manner. By employing the instant process, rutile composite pigment may be prepared without the necessity of first separately preparing rutile converting seeds or promoters and then employing same in some step of the process. The instant process is direct and does not require additional equipment or those processing steps, which are normally required to separately produce rutile promoting or converting agents outside of the precipitation step.

While this invention has been described and illustrated by the examples shown, it is not intended to be strictly limited thereto, and other modifications may be employed within the scope of the following claims.

I claim:

1. Method for the preparation of a rutile titanium dioxide composite pigment which comprises; forming an aqueous slurry of an alkaline earth metal sulphate, forming a titanium sulphate solution, initially boiling one portion amounting to between 5% and 50% of said titanium sulphate solution in the presence of said slurry, thereby forming a mixture of precipitated titanium values and said alkaline earth metal sulphate, combining the remaining portion of said titanium sulphate solution with said mixture and further boiling the combination to substantially completely precipitate the remaining titanium values, filtering and washing the combined precipitated titanium values and alkaline earth metal sulphate and subsequently calcining the combined precipitate at a temperature from 900° C. to 1000° C. thereby forming a rutile titanium dioxide composite pigment.

2. Method according to claim 1 wherein the portion of titanium sulphate solution initially boiled in the presence of said slurry amounts to between about 25% and 50% of said titanium sulphate solution.

3. Method according to claim 1 in which said alkaline earth metal sulphate slurry comprises about 20–35% solids and contains about 50 grams per liter sulphuric acid.

4. Method according to claim 1 in which said titanium sulphate solution possesses a basicity of from about 20% up to about 50%.

5. Method according to claim 1 in which the total amount of sulphuric acid present in both the portion of titanium sulphate solution and the alkaline earth metal sulphate slurry prior to the initial boiling action is adjusted so that from about 2.5 to 5.0 parts (by weight) of sulphuric acid are present for each part of titanium dioxide.

6. Method according to claim 1 in which said rutile composite pigment contains approximately 30% (weight basis) titanium dioxide and about 70% alkaline earth metal sulphate.

7. Method according to claim 1 wherein the alkaline earth metal sulphate is calcium sulphate.

8. Method according to claim 1 wherein the alkaline earth metal sulphate is barium sulphate.

References Cited in the file of this patent
UNITED STATES PATENTS

| Number | Name | Date |
|---|---|---|
| 1,851,487 | Blumenfeld | Mar. 29, 1932 |
| 2,098,278 | Dahlstrom | Nov. 9, 1937 |
| 2,444,237 | Aagaard et al. | June 29, 1948 |
| 2,549,261 | Sullivan | Apr. 17, 1951 |

OTHER REFERENCES

White: "Titanium-Barium Pigment" Drug, Oils and Paints, vol. 47, #17, October 1932, page 645.